(12) United States Patent
Zhu et al.

(10) Patent No.: US 8,998,237 B2
(45) Date of Patent: Apr. 7, 2015

(54) TWO-WHEELED VEHICLE PARKING MECHANISM

(75) Inventors: Anding Zhu, Suzhou (CN); Lu Liu, Suzhou (CN)

(73) Assignee: Suzhou Eagle Electric Vehicle Manufacturing Co., Ltd., Suzhou (CN)

( * ) Notice: Subject to any disclaimer, the term of this patent is extended or adjusted under 35 U.S.C. 154(b) by 0 days.

(21) Appl. No.: 13/985,267

(22) PCT Filed: Jul. 8, 2011

(86) PCT No.: PCT/CN2011/001129
§ 371 (c)(1),
(2), (4) Date: Aug. 13, 2013

(87) PCT Pub. No.: WO2012/119278
PCT Pub. Date: Sep. 13, 2012

(65) Prior Publication Data
US 2013/0320649 A1    Dec. 5, 2013

(30) Foreign Application Priority Data

Mar. 4, 2011   (CN) .......................... 2011 1 0052264
Mar. 4, 2011   (CN) ...................... 2011 2 0055426 U

(51) Int. Cl.
| | |
|---|---|
| *B62H 1/02* | (2006.01) |
| *B62K 25/08* | (2006.01) |
| *B62H 1/04* | (2006.01) |
| *B62K 25/04* | (2006.01) |

(52) U.S. Cl.
CPC ............ *B62H 1/02* (2013.01); *B62K 2025/045* (2013.01); *B62K 25/08* (2013.01); *B62H 1/04* (2013.01)

(58) Field of Classification Search
CPC .......................................................... B62H 1/00
USPC ......................................... 280/298–303, 296
See application file for complete search history.

(56) References Cited

U.S. PATENT DOCUMENTS

| | | | | |
|---|---|---|---|---|
| 4,145,069 | A | * | 3/1979 | Kissick ......................... 280/303 |
| 4,660,847 | A | * | 4/1987 | Yagasaki ....................... 280/298 |
| 4,671,374 | A | * | 6/1987 | Kouyama et al. ............. 180/219 |

(Continued)

FOREIGN PATENT DOCUMENTS

| | | |
|---|---|---|
| CN | 2483291 | 3/2002 |
| CN | 201951581 U | 8/2011 |

(Continued)

OTHER PUBLICATIONS

Office action dated Mar. 1, 2013 from corresponding Chinese Patent Application No. 201110052264.8 and the English summary provided by the clients.

(Continued)

*Primary Examiner* — Joseph Rocca
*Assistant Examiner* — Gabriela C Craciun
(74) *Attorney, Agent, or Firm* — Ladas & Parry, LLP

(57) ABSTRACT

A two-wheeled vehicle parking mechanism, comprising a lifting and dropping gear, the lifting and dropping gear being provided with two front wheel driving rods set in parallel, each front wheel driving rod comprising a first sliding rod and a second sliding rod, the first sliding rod sliding relatively to the second sliding rod, and the mechanism comprising a controlling part that connects to the second sliding rod for controlling the lifting and dropping of the front wheel.

11 Claims, 5 Drawing Sheets

(56) References Cited

U.S. PATENT DOCUMENTS

| | | | | |
|---|---|---|---|---|
| 5,118,126 | A * | 6/1992 | Yaple | 280/293 |
| 5,507,200 | A * | 4/1996 | Reed et al. | 74/473.16 |
| 6,134,984 | A * | 10/2000 | Hisadomi | 74/502.2 |
| 6,276,707 | B1 * | 8/2001 | Ungvari | 280/293 |
| 2005/0275191 | A1 * | 12/2005 | Takahashi | 280/302 |
| 2011/0089664 | A1 * | 4/2011 | Ogawa et al. | 280/301 |

FOREIGN PATENT DOCUMENTS

| | | |
|---|---|---|
| JP | 1-262271 | 10/1989 |
| JP | 2010-76586 | 4/2010 |
| WO | 90/11218 A1 | 10/1990 |
| WO | WO 9011218 A1 * | 10/1990 ............. B62K 25/08 |

OTHER PUBLICATIONS

Office action dated Oct. 15, 2013 from corresponding Chinese Patent Application No. 201110052264.8 and the English summary provided by the clients.

IPRP for related PCT/CN2011/001129 dated Sep. 10, 2013 and its English translation.

ISR for related PCT/CN2011/001129 dated Nov. 24, 2011 and its English translation.

* cited by examiner

TWO-WHEELED VEHICLE PARKING MECHANISM

CROSS-REFERENCE TO RELATED APPLICATIONS

This application is the U.S. National Stage of International Patent Application No. PCT/CN2011/001129 filed on Jul. 8, 2011, which claims priority to Chinese Patent Application No. 201110052264.8, filed on Mar. 4, 2011, and Chinese Patent Application No. 201120055426.9, filed on Mar. 4, 2011, the disclosures of which are hereby incorporated by reference in their entireties.

FIELD OF THE INVENTION

The present invention relates to a two-wheeled vehicle parking mechanism.

BACKGROUND OF THE INVENTION

With the development of society, living standards of people are getting higher and higher. Two-wheeled vehicles become more and more as tools to ride instead of walk so as to bring greater convenience to people.

There are two general manners respectively corresponding to two kinds prop stands of conventional two-wheeled vehicles. One kind of the prop stands are monopods and the other kind of the prop stands are bipods. The monopod is arranged to a bottom and a lateral side of the vehicle body. When parking the two-wheeled vehicles, the monopod is opened so as to cause the vehicle body inclined towards the lateral side at which the monopod is arranged. Two wheels and the monopod together form a three-point support. As a result, this monopod parking manner saves labor and is convenient for using. However, because the vehicle body of the monopod parking manner is inclined, the monopod bears great weight which may cause the two-wheeled vehicles unstable and easy to fall on one side. The bipod is provided with two support legs symmetrically mounted on opposite sides of the vehicle body. With such two support legs for parking the two-wheeled vehicle, there is no need to incline the vehicle body. The two support legs and one of the wheels jointly form a three-point support. As a result, this bipod parking manner is much stable and not easy to fall on one side. However, since the vehicle body of the two-wheeled vehicle is provided with heavy weight, it is very hard for people, especially the weaklings, to uplift the vehicle body for parking.

Hence, it is necessary to provide a new two-wheeled vehicle parking mechanism.

BRIEF SUMMARY OF THE INVENTION

An object of the present application is to provide a parking mechanism capable of controlling uplift of a front wheel and realizing parking.

In order to solve the above technical problems, it is provided according to the present application a two-wheeled vehicle parking mechanism which includes a lifting and dropping gear. The lifting and dropping gear is provided with two front wheel driving rods set in parallel. Each front wheel driving rod includes a first sliding rod and a second sliding rod. The second sliding rod is connected to a front wheel. The first sliding rod is slidable relatively to the second sliding rod. The parking mechanism further includes a controlling part that connects to the second sliding rod for controlling the lifting and dropping of the front wheel.

It is also provided according to the present application a two-wheeled vehicle parking mechanism which includes a stop mechanism. The stop mechanism includes a bipod for supporting the two-wheeled vehicle and a controlling part for controlling rotation of the bipod. The controlling part and the bipod are respectively provided with a first capstan and a second capstan under condition that the first capstan and the second capstan are connected by cables.

Comparing with the prior arts, the advantages of the present application are as follows: via operating the controlling part to lay down the bipod which supports the two-wheeled vehicle, and then via operating the controlling part to control movement of the front wheel driving rods to easily uplift the front wheel, the bipod and a rear wheel jointly form a three-point support for realizing parking. As a result, the parking manner of the present application is stable, convenient and labor-saving.

DETAILED DESCRIPTION OF THE PREFERRED EMBODIMENT

Figure 1:
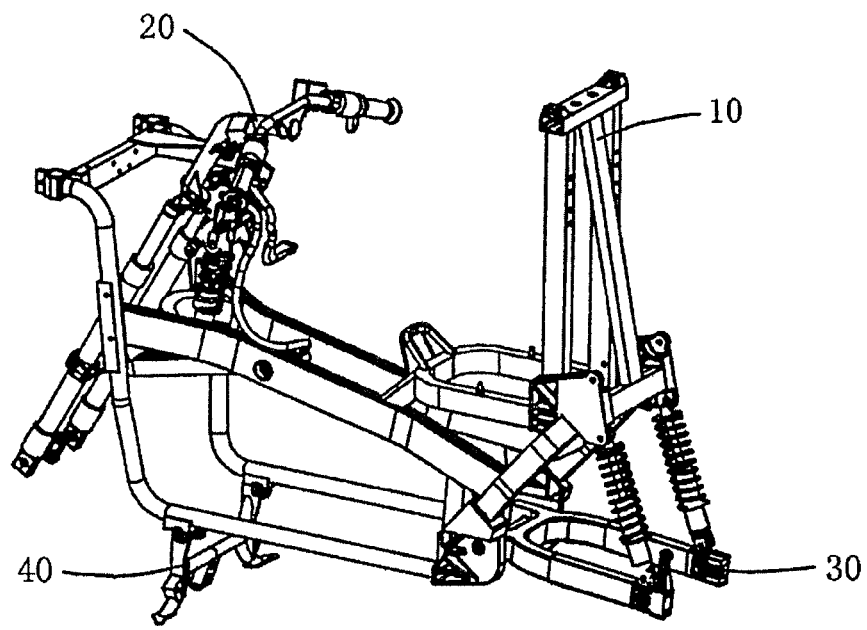
FIG. 1 is an assembled perspective view of a vehicle frame, a front assembly and a rear wheel assembly in accordance with an illustrated embodiment of the present invention.

Referring to FIG. 1, the present application discloses a two-wheeled vehicle which includes a vehicle frame 10, front and rear wheels (not shown) respectively mounted at front and rear of the vehicle frame 10, a front assembly 20 located at the front of the vehicle frame 10, a rear wheel assembly 30 located at the rear of the vehicle frame 10, and a parking mechanism 40 connected to the vehicle frame 10.

Figure 2:
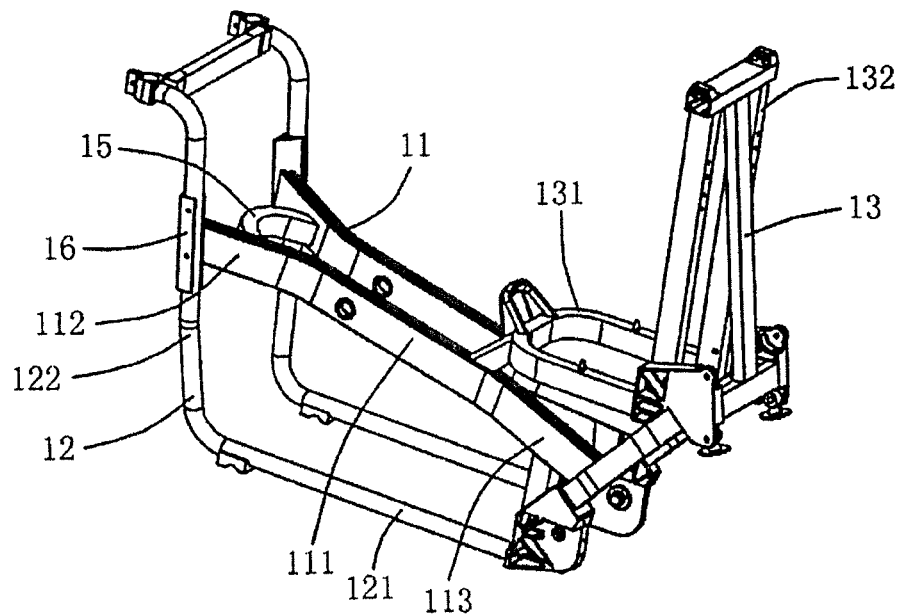
FIG. 2 is a perspective view of the vehicle frame in accordance with the illustrated embodiment of the present invention.

Referring to FIG. 2, the vehicle frame 10 includes a pair of support beams 11, a pair of side brackets 12 and a seat bracket 13. The support beams 11, the side brackets 12 and the seat bracket 13 are assembled together so as to form a cradle-type vehicle frame.

Figure 3:
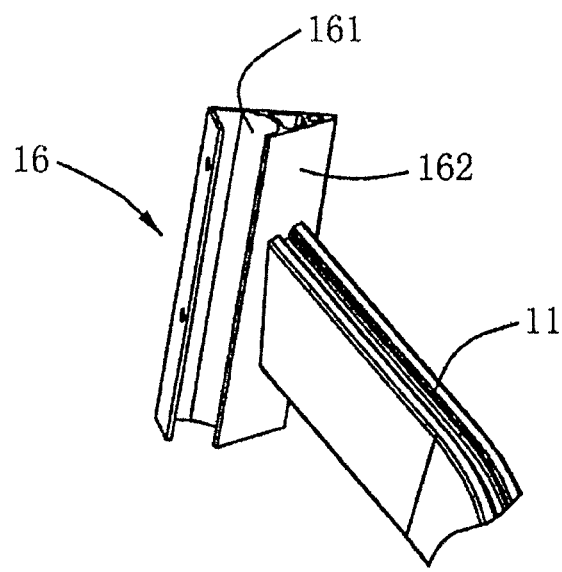
FIG. 3 is a perspective view of a fixing member in accordance with the illustrated embodiment of the present invention.
Figure 5:
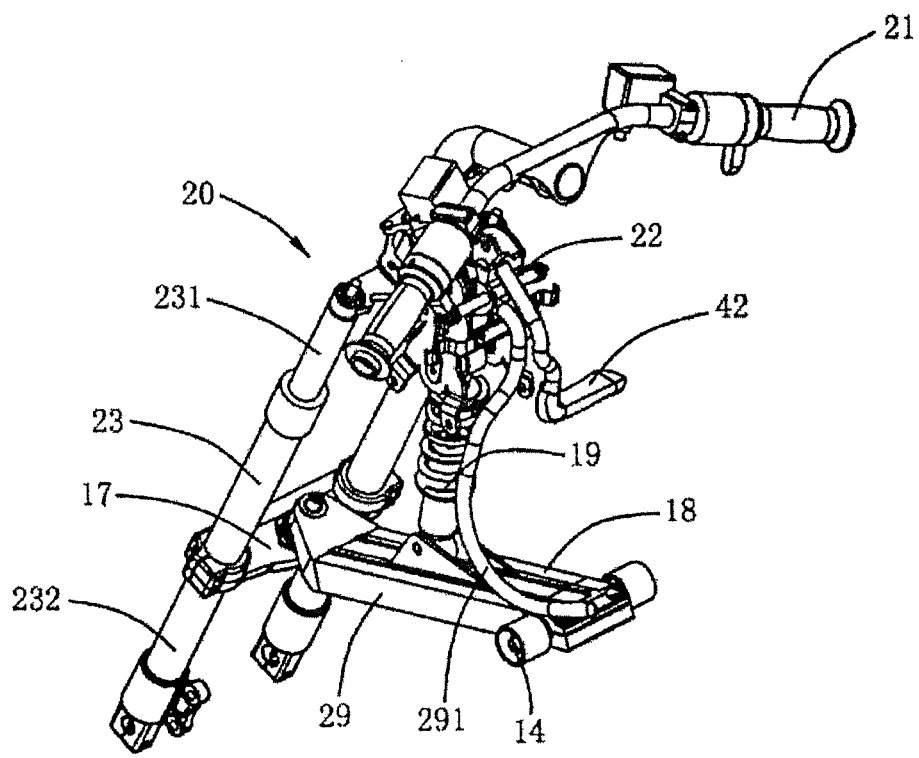
FIG. 5 is a perspective view of the front assembly in accordance with the illustrated embodiment of the present invention.

The number of the support beams 11 is two. Each support beam 11 includes a first support beam and a second support beam located at the same level. Each support beam 11 is made of a metal material of high rigidity and defines a top recess (as shown in FIG. 3) extending along a longitudinal direction thereof. A cross section of the support beam 11 is notch-shaped. Each support beam 11 includes a rectangular flat portion 111, a first bent portion 112 bent from a first end of the flat portion 111 and a second bent portion 113 bent from a second end of the flat portion 111. The first bent portion 112 and the second bent portion 113 are located at the same side of the flat portion 111. The first bent portion 112 and the second bent portion 113 together with the flat portion 111 form a concave recess. The pair of support beams 11 are organized back-to-back and located horizontally. The concave recesses of the pair of support beams 11 are opened to an exterior along opposite directions. The two flat portions 111 are fixedly connected by a metal axis 14 (as shown in FIG. 5). The two first bent portions 112 are connected by a connecting beam 15 of an arced configuration. The pair of side brackets 12 are symmetrically located at opposite sides of the support beam 11. Each side bracket 12 is L-shaped and includes a horizontal lever 121 disposed below the support beam 11 and a vertical lever 122 essentially perpendicular to the horizontal lever 121. The horizontal lever 121 is securely connected to the second bent portion 113 of the support beam 11. The vertical lever 122 is securely connected to the first bent portion 112 of the support beam 11 via a triangle fixing member 16. The seat bracket 13 is fixed to a top rear side of the second bent portions 113 of the support beam 11. The seat bracket 13 includes a bottom bracket 131 for bearing human body and a backrest bracket 132 for resisting against the human back.

Through assembling the support beams 11, the side brackets 12 and the seat bracket 13 together, the cradle-type vehicle frame 10 according to the present design makes the driver feel more comfortable during driving. Besides, the notch-shaped metal support beam 11 is bent from a metal plate and is capable of enduring high pressure and great collision force so as to greatly improve the rigidity of the vehicle body.

Referring to FIG. 3, the triangle fixing member 16 is used to fix the side brackets 12 and the support beam 11. The fixing member 16 includes a receiving hole 161 for receiving the vertical lever 122 and an extending portion 162 connected to the support beam 11. When the two-wheeled vehicle suffers collision, the collision force may be transferred to the support beam 11 through the fixing member 16. Since the support beam 11 is strong, it is capable of resisting external force, avoiding large deformation of the two-wheeled vehicle, and ultimately protecting the driver.

Figure 6:
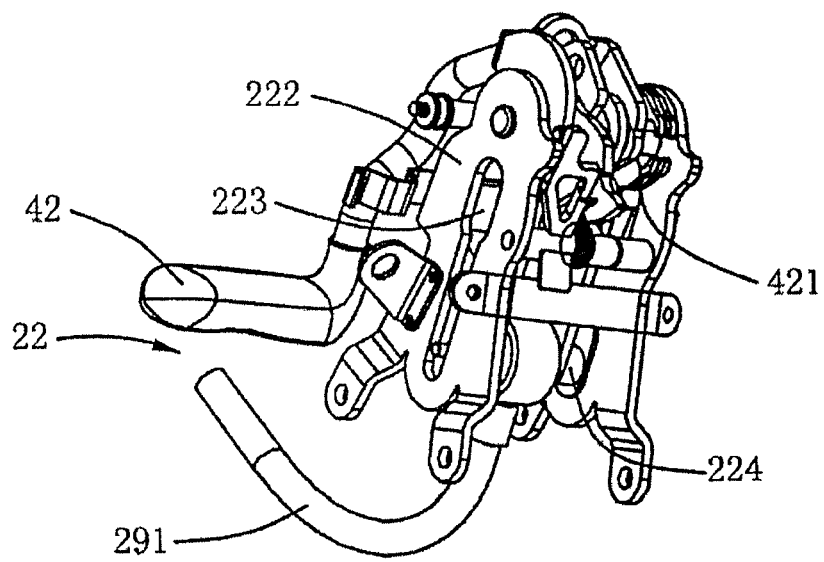
FIG. 6 is a perspective view of a controlling part in accordance with the illustrated embodiment of the present invention.
Figure 9:
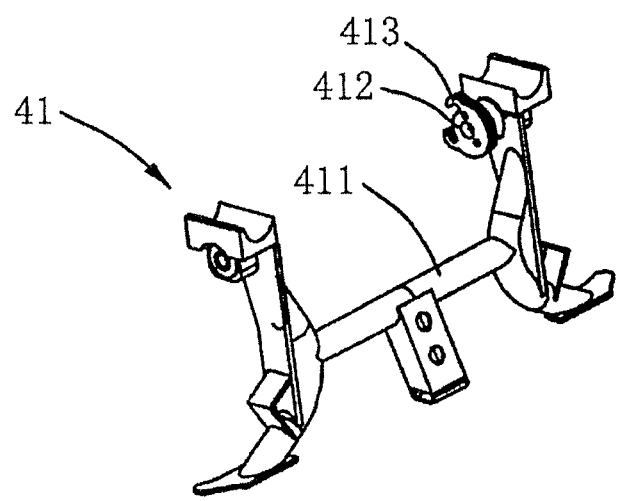
FIG. 9 is a perspective view of a bipod in accordance with the illustrated embodiment of the present invention.

Referring to FIGS. 1, 6 and 9, the parking mechanism 40 includes a bipod 41 and a controlling rod 42 for controlling the bipod 41. The bipod 41 is rotatably mounted to the horizontal lever 121 and includes three foots (not labeled). Two lateral foots are rotatably mounted to the pair of horizontal levers 121 and are bridged by a round rod 411. The remaining middle foot is fixedly connected to the round rod 411. Bottom surfaces of the three foots of the bipod 41 are coplanar. An end of the bipod 41 far from the horizontal lever 121 is connected to the horizontal lever 121 via a spring. The spring tightly pulls the bipod 41 to a first position where the bipod 41 is driven by the spring to rotate almost parallel to the horizontal lever 121. Besides, the bipod 41 defines a second position where the bipod 41 oppositely rotates 90 degrees relative to the horizontal lever 121 from the first position. The bipod 41 is essentially perpendicular to the horizontal levers 121 at the second position. The controlling rod 42 is mounted to a controlling part 22 for controlling the bipod 41 rotates from the first position to the second position. The controlling rod 42 and the bipod 41 are respectively provided with a first capstan 421 and a second capstan 412. The first capstan 421 and the second capstan 412 can be of the same configurations, and are fixed to the controlling rod 42 and the bipod 41, respectively. A spindle 225 is arranged between a pair of metal plates 222 with the first capstan 421 mounted on the spindle 225. The controlling rod 42 includes a connecting bracket 226 which is rotatably mounted to the spindle 225 and is also fixed to the first capstan 421. When the controlling rod 42 is uplifted and rotates around the spindle 225, the first capstan 421 can be driven to rotate accordingly.

Figure 4:
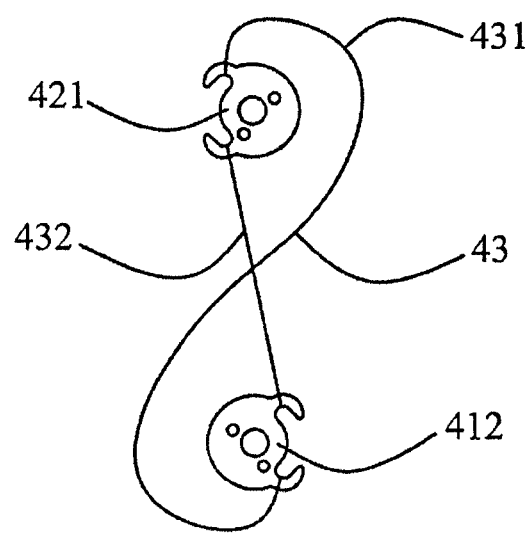
FIG. 4 is a perspective view of a first capstan and a second capstan mating with each other in accordance with the illustrated embodiment of the present invention.

Referring to FIG. 4, the first capstan 421 and the second capstan 412 are connected by cables 43 which are of Arab number eight configuration. Each capstan includes two locks 413 for being fixedly connected to an end of the cables 43. One lock of the first capstan 421 is connected to one lock of the second capstan 412 via the cable, and the other lock of the first capstan 421 is connected to the other lock of the second capstan 412 via the cable. When the first capstan 421 is driven by the controlling rod 42 to rotate along a first direction, the lock of the first capstan 421 pulls the corresponding lock of the second capstan 412 via the cable. As a result, the second capstan 412 is driven to be rotatable along a third direction, and thereby driving rotation of the bipod 41. When the first capstan 421 is driven by the controlling rod 42 to rotate along a second direction opposite to the first direction, the lock of the first capstan 421 pulls the corresponding lock of the second capstan 412 via the cable. As a result, the second capstan 412 is driven to be rotatable along fourth direction opposite to the third direction, and thereby driving rotation of the bipod 41.

Referring to FIG. 4, the two locks of each capstan form an opening which further includes a first opening and a second opening. The first capstan 421 is set on top of the controlling rod 42 and the opening thereof is opened along a direction, i.e., a front direction, to the front assembly 20. The second capstan 412 is set at bottom of the bipod 41 and the opening thereof is opened along an opposite direction, i.e., a rear direction. The cables 43 include a first cable 431 and a second cable 432. One end of the first cable 431 is connected to the upper lock of the first capstan 412. The first cable 431 bypasses the first capstan 412 from a top side thereof and then extends downwardly across a center line of the two capstans. The first cable 431 is ultimately connected to the lower lock of the second capstan 412 from a bottom side thereof. One end of the second cable 432 is connected to the bottom lock of the first capstan 421 and the other end of the second cable 432 is connected to the upper lock of the second capstan 412. The first and the second cables are of Arab number eight configuration. When the first capstan 421 rotates anticlockwise, the second capstan 412 is rotatable clockwise under the action of the first cable 431, and thereby driving the bipod 41 rotates to the second position. When the first capstan 421 rotates clockwise, the second capstan 412 is rotatable clockwise under the action of the second cable 432, and thereby driving the bipod 41 rotates to the first position.

When the bipod 41 is located at the second position, the front wheel, the rear wheel and a bottom surface of the bipod 41 are coplanar. It is easy to understand that when the bipod 41 rotates from the first position to the second position, a small gap is allowed to exist between the bottom surface of the bipod 41 and the ground surface. That is to say, the bottom surface of the bipod 41 is slightly higher than a surface of the rear wheel and the front wheel.

In the present application, the processes of the bipod 41 rotating from the first position to the second position is as follows: firstly, operating the controlling rod 42; secondly, the first capstan 421 rotating under the drive of the controlling rod 42; thirdly, the first capstan 421 pulling the cable and driving rotation of the second capstan 412; fourthly, the second capstan 412 driving rotation of the bipod 41 so as to make the bipod 41 rotate from the first position to the second position. Under this condition, the spring is stretched so as to provide a moment of force which drives the bipod rotate from the second position back to the first position.

When the bipod 41 is located at the second position, the bipod 41 is inoperative to support the vehicle body.

The illustrated structure and arrangement of the first and the second capstans 421, 412 are preferred embodiment of the present application. However, the directions of the openings formed by the locks of each capstan can be adjusted. For example, the opening of the first capstan can be adjusted to be opened backwardly, the opening of the second capstan can be adjusted to be opened forwardly, and the connecting manners of the cables are adjusted accordingly. Besides, in other embodiments, the locks of each capstan can be formed on arbitrary positions of the capstan. For example, the locks can be set on lateral sides of the capstan and are arranged in alignment of an extension line of a same diameter. The two cables are arranged in parallel. When the capstans rotate clockwise or anticlockwise, the rotatable capstan can drive rotation of the other capstan via the cables so as to realize lifting and dropping of the bipod.

Referring to FIG. 5, the front assembly 20 is connected to a front side of the vehicle frame 10 and includes a handle 21 and a lifting and dropping gear 29. The lifting and dropping gear 29 includes two front wheel driving rods 23 which include two hydraulic rods set in parallel. The two front wheel driving rods 23 are fixedly connected by a bottom plate 17. Distal ends of the front wheel driving rods 23 are associated with a front wheel. The front wheel driving rods 23 are rotatably mounted to the vehicle frame 10 by a connecting plate 18 under condition that one end of the connecting plate 18 is extended through by the metal axis 14 so that the connecting plate 18 is rotatably connected to the vehicle frame 10, and the other end of the connecting plate 18 is rotatably connected to the bottom plate 17 by a bearing. Besides, a damper connecting rod 19 is connected between the controlling part 22 and the connecting plate 18. The damper connecting rod 19 not only realizes function of damping but also drives the connecting plate 18 rotating around the meal axis 14 via an up-and-down movement of the damper connecting rod 19. Thereby, the rotation of the connecting plate 18 may drive an up-and-down movement of the front wheel driving rods 23.

Figure 7:
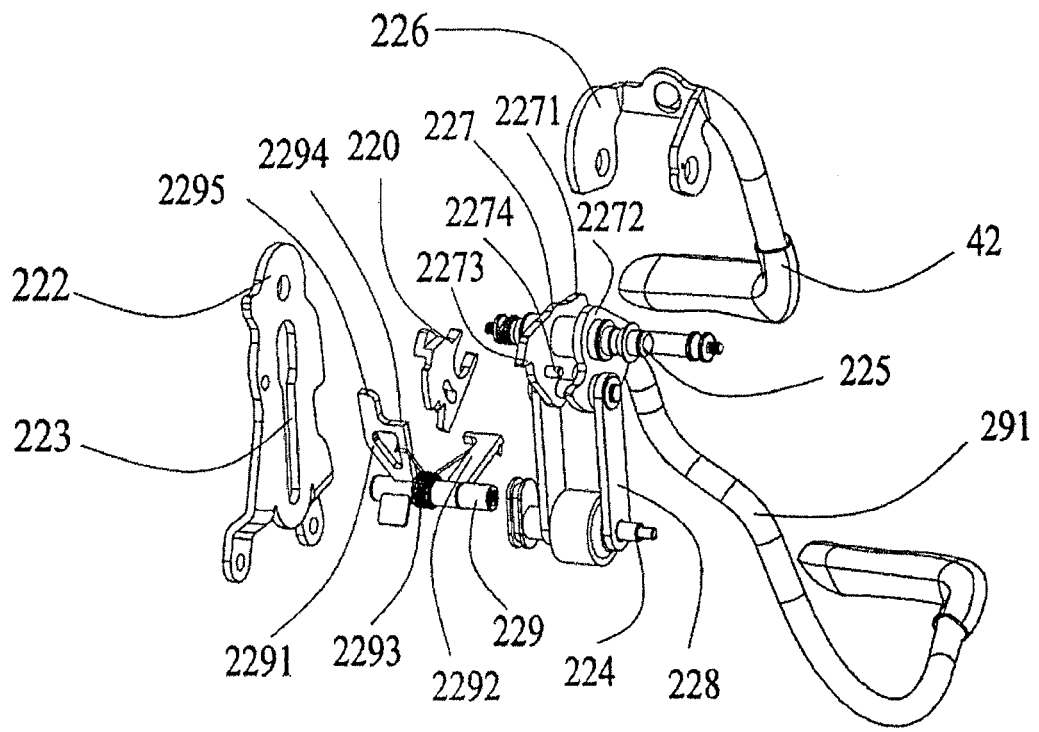
FIG. 7 is an exploded view of the controlling part in accordance with the illustrated embodiment of the present invention.

Referring to FIGS. 5, 6 and 7, the lifting and dropping gear 29 includes the controlling part 22, a lifting and dropping operation rod 291, the damper connecting rod 19 associated with a spring, the connecting plate 18 and the front wheel driving rods 23. The controlling rod 42 and the lifting and dropping operation rod 291 are set on the controlling part 22. The pair of metal plates 222 are located at opposite lateral sides of the controlling rod 42 and the lifting and dropping operation rod 291. The metal plates 222 include two sliding grooves 223 at opposite corresponding positions thereof and a metal rod 224 up-and-down moveable in the sliding grooves 223. One end of the damper connecting rod 19 is rotatably connected to the metal rod 224 and is up-and-down movable together with the metal rod 224. A distal end of the lifting and dropping operation rod 291 is welded by a lifting and dropping connecting frame 227 through which the spindle 225 extends. The lifting and dropping connecting frame 227 includes a stop plate 2271 and a drive plate 2272 parallel to the stop plate 2271. The stop plate 2271 and the drive plate 2272 are perpendicular to the spindle 225. The stop plate 2271 and the metal rod 224, and the drive plate 2272 and the metal rod 224 are both connected by a connecting arm 228. One end of the connecting arm 228 is eccentrically mounted to the stop plate 2271 and the drive plate 2272 and the other end of the connecting arm 228 is rotatably connected to the metal rod 224. When the lifting and dropping operation rod 291 is uplifted, the lifting and dropping connecting frame 227 is driven to rotate around the spindle 225. The rotation of the stop plate 2271 and the drive plate 2272 drives the connecting arm 228 rising upwardly, thereby the metal rod 224 is driven to slide along the sliding grooves 223.

The pair of metal plates 222 are connected therebetween a stop shaft 229 which is associated with a torsional spring 2293. The stop shaft 229 extends through a first stop member 2291 and a second stop member 2292 which is relatively rotatable to the first stop member 2291. Two ends of the torsional spring 2293 are connected to the first stop member 2291 and the second stop member 2292, respectively, so that the first stop member 2291 and the second stop member 2292 suffer opposite rotation forces.

The first stop member 2291 includes a resisting portion 2294 and a protrusion portion 2295. The stop plate 2271 includes a lock 2273 for mating with the resisting portion 2294. Before operating the lifting and dropping operation rod 291, the first stop member 2291 moves towards the stop plate 2271 under the action of the torsional spring 2293, and the resisting portion 2294 abuts against the lock 2273 of the stop plate 2271, thereby the lifting and dropping operation rod 291 is prevented from being uplifted. A top edge of the connecting bracket 226 is of an irregular arc configuration so as to form a cam mechanism. The protrusion portion 2295 of the first stop member 2291 always presses against an arced side surface of the connecting bracket 226. When the lifting and dropping operation rod 291 is uplifted, the first stop member 2291 is pushed away by the arced side surface of the connecting bracket 226 so that the resisting portion 2294 of the first stop member 2291 breaks away from the lock 2273 of the stop plate 2271. Under this condition, the lifting and dropping operation rod 291 can be uplifted. With arrangement of the first stop member 2291, the lifting and dropping operation rod 291 can only be uplifted after completing operation of the controlling rod 42.

Figure 8:
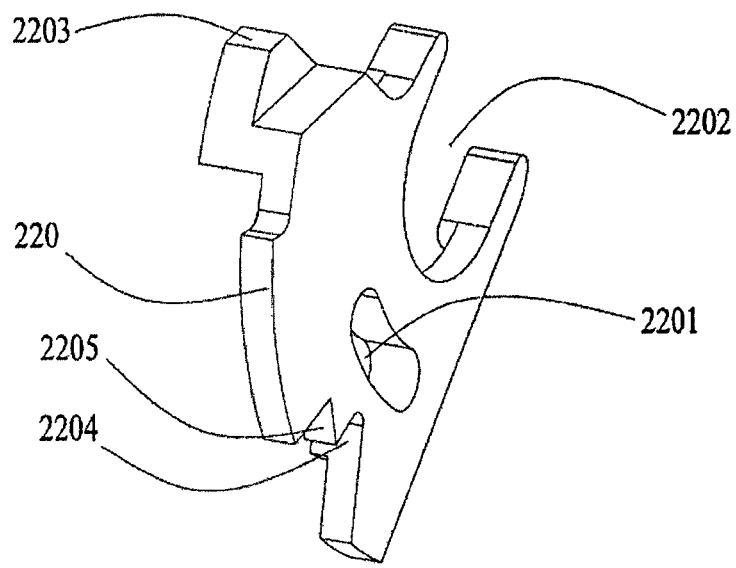
FIG. 8 is a perspective view of a stop member in accordance with the illustrated embodiment of the present invention.

The second stop member 2292 is L-shaped and includes a vertical lever (not labeled) and a horizontal lever (not labeled). The second stop member 2292 is mateable with a stop member 220 so as to stop the lifting and dropping operation rod 291 at the uplift position. Referring to FIG. 8, the stop member 220 reclines on a surface of the stop plate 2271. The surface faces the drive plate 2272. The stop member 220 includes an arced sliding slot 2201, an arced opening 2202 for rotatably receiving the spindle 225, a protrusion 2203 protruding on top of the stop plate 2271 and a notch 2204 formed on an edge of the stop member 220. The stop plate 2271 is associated with a round rod 2274 on a side facing the drive plate 2272. The round rod 2274 extends through the arced sliding slot 2201. The stop member 220 is rotatable around the spindle 225 along the round rod 2274 under a predetermined angle scope. When the controlling rod 42 is uplifted, the protrusion portion 2295 is pushed away by the arced side surface of the connecting bracket 226 so that the resisting portion 2294 of the first stop member 2291 breaks away from the lock 2273 of the stop plate 2271. When further uplifts the lifting and dropping operation rod 291, the stop plate 2271 drives the round rod 2274 sliding along the arced sliding slot 2201. Under this condition, the stop member 220 is motionless. When the round rod 2274 rotates adjacent to a bottom end of the arced sliding slot 2201, the stop member 220 is driven to rotate around the spindle 225. Meanwhile, the vertical lever of the second stop member 2292 is pushed away by an arced bottom edge of the drive plate 2272. When the lifting and dropping operation rod 291 is released, a horizontal lever of a L-shaped hook of the second stop member 2292 slides into the notch 2204 along an edge of the stop member 220. At the same time, the lifting and dropping connecting frame 227 slides along the sliding slot 2201 during releasing. When the lifting and dropping connecting frame 227 slides to the top of the sliding slot 2201, the stop plate 2271 is stopped by the protrusion 2203 so as to stop the lifting and dropping operation rod 291 at the uplift position. When further uplifts the lifting and dropping operation rod 291, the drive plate 2272 drives rotation of the stop member 220, the vertical lever of the second stop member 2292 is pushed away by the arced bottom edge of the drive plate 2272 so that the second stop member 2292 breaks away from the notch 2204. The stop member 220 continues to rotate anticlockwise (referring to angles of FIGS. 7 and 8), the second stop member 2292 is locked in a cutout 2205. A radius of the cutout 2205 is larger than that of the notch 2204. When the lifting and dropping operation rod 291 is laid down again, the stop member 220 keeps irrotational till the lock 2273 of the stop plate 2271 resists against the protrusion 2203. Under this condition, the arced bottom edge of the drive plate 2272 abuts against the second stop member 2292 so that the second stop member 2292 breaks away from the cutout 2205. The drive plate 2272 drives the stop member 2292 rotating clockwise so as to drop the lifting and dropping operation rod 291 and drop the front wheel to the ground. As a result, a circle of lifting and dropping the front wheel is completed.

Each front wheel driving rod 23 includes a first sliding rod 231 and a second sliding rod 232. The first sliding rod 231 is slideable relative to a direction of the second sliding rod 232. The bottom plate 17 is fixedly connected between the two second sliding rods 232.

In the present application, the main purposes of the lifting and dropping gear 29 are that, when the bipod 41 rotates from the first position to the second position, the front wheel can realize to be higher off the ground via operating the lifting and dropping operation rod 291 and ultimately realizes supporting function of the rear wheel and the bipod 41. When the bipod 41 rotates from the first position to the second position, the operation of the lifting and dropping gear 29 is realized as follows: firstly, operating the lifting and dropping operation rod 291; secondly, the rotation of the lifting and dropping operation rod 291 pulling the metal rod 224 to move upwardly; thirdly, the metal rod 224 sliding along the sliding grooves 223 and driving the damper connecting rod 19 to move upwardly; fourthly, the rise of the damper connecting rod 19 making the connecting plate 18 rotating around the metal axis 14; fifthly, the second sliding rod 232 connected to the front wheel being pulled by the connecting plate 18 to rise so as to drive the front wheel higher off the ground.

In the present application, the parking of the two-wheeled vehicle is completed via firstly letting the bipod 41 rotate from the first position to the second position through the parking mechanism 40, and secondly realizing the front wheel higher off the ground through the lifting and dropping gear 29. The whole operation only needs to operate the controlling rod 42 and the lifting and dropping operation rod 291, respectively, as a result that it is stable, convenient and labor-saving during parking the two-wheeled vehicle.

The description of the above embodiment is only used for the understanding of the present application. It should be noted that, those skilled in the art may make many improvements and modifications to the present application without departing from the principle of the present application, and these improvements and modifications also fall into the protection scope of the claims of the present application.

What is claimed is:

1. A two-wheeled vehicle parking mechanism comprising:
   a lifting and dropping gear which is provided with two front wheel driving rods set in parallel, each front wheel driving rod comprising a first sliding rod and a second sliding rod, the second sliding rod being connected to a front wheel, the first sliding rod being slidable relatively to the second sliding rod; and
   a controlling part which connects to the second sliding rod in order to control lifting and dropping of the front wheel;
   wherein the controlling part comprises a spindle, a lifting and dropping operation rod, and a lifting and dropping connecting frame fixedly connected to the lifting and dropping operation rod, the spindle extending through the lifting and dropping connecting frame so that the lifting and dropping connecting frame is rotatable around the spindle;
   wherein the lifting and dropping connecting frame comprises a drive plate and a stop plate parallel to the drive plate, the spindle extends through the drive plate and the stop plate, and the drive plate and the stop plate are both rotatable around the spindle; and
   a connecting arm connected to the drive plate and another connecting arm connected to the stop plate, one end of the connecting arm being eccentrically mounted to the drive plate and one end of the another connecting arm being eccentrically mounted to the stop plate.

2. The two-wheeled vehicle parking mechanism as claimed in claim 1, wherein a connecting point formed by the drive plate and the connecting arm is coaxial with another connecting point formed by the stop plate and the another connecting arm, the two-wheeled vehicle parking mechanism further comprising a damper connecting rod jointly connected to the other end of the connecting arm and the other end of the another connecting arm.

3. The two-wheeled vehicle parking mechanism as claimed in claim 2, further comprising a pair of metal plates on lateral sides of the lifting and dropping operation rod, opposite ends of the spindle being fixed to the metal plates, each metal plate comprising a sliding groove, the lifting and dropping gear comprising a metal rod moveable along the sliding groove.

4. The two-wheeled vehicle parking mechanism as claimed in claim 1, further comprising a stop shaft associated with a first stop member for restricting the stop plate and a second stop member for mating with the drive plate, and a torsional spring mounted between the first stop member and the second stop member so as to provide opposite rotation force of the first stop member and the second stop member.

5. The two-wheeled vehicle parking mechanism as claimed in claim 4, wherein the first stop member comprises a resisting portion and a protrusion portion, and the stop plate comprises a lock for mating with the resisting portion so as to restrict the stop plate.

6. The two-wheeled vehicle parking mechanism as claimed in claim 4, wherein the second stop member is L-shaped and comprises a vertical lever and a horizontal lever.

7. The two-wheeled vehicle parking mechanism as claimed in claim 6, further comprising a stop member through which the spindle extends, the stop member being mounted on a surface of the stop plate under condition that the surface faces the drive plate, the stop member comprising an arced sliding slot, an arced opening for rotatably receiving the spindle, a protrusion protruding on top of the stop plate, and a notch and a cutout formed on an edge of the stop member, the stop plate comprising a round rod extending towards the drive plate under condition that the round rod extends through the arced sliding slot, the stop member being rotatable around the arced opening and along a scope of the arced sliding slot.

8. The two-wheeled vehicle parking mechanism as claimed in claim 5, wherein the horizontal lever of the second stop member is mateable with the notch and the cutout of the stop member, and the vertical lever of the second stop member is capable of resisting against the drive plate.

9. The two-wheeled vehicle parking mechanism as claimed in claim 1, wherein the front wheel driving rods are hydraulic rods, the two-wheeled vehicle parking mechanism comprising a bottom plate fixedly connected between the second sliding rods, the bottom plate being further connected to the controlling part.

10. The two-wheeled vehicle parking mechanism as claimed in claim 9, wherein the lifting and dropping gear further comprises a connecting plate, one end of the connecting plate is rotatably connected to the two-wheeled vehicle, and the other end of the connecting plate is rotatably connected to the bottom plate.

11. The two-wheeled vehicle parking mechanism as claimed in claim 10, wherein one end of the damper connecting rod is connected to the controlling part and the other end of the damper connecting rod is connected to the connecting plate.

* * * * *